Aug. 24, 1948. R. M. NARDONE 2,447,912
SCAVENGING MEANS FOR AIRCRAFT ENGINES
Filed March 21, 1944 2 Sheets-Sheet 1
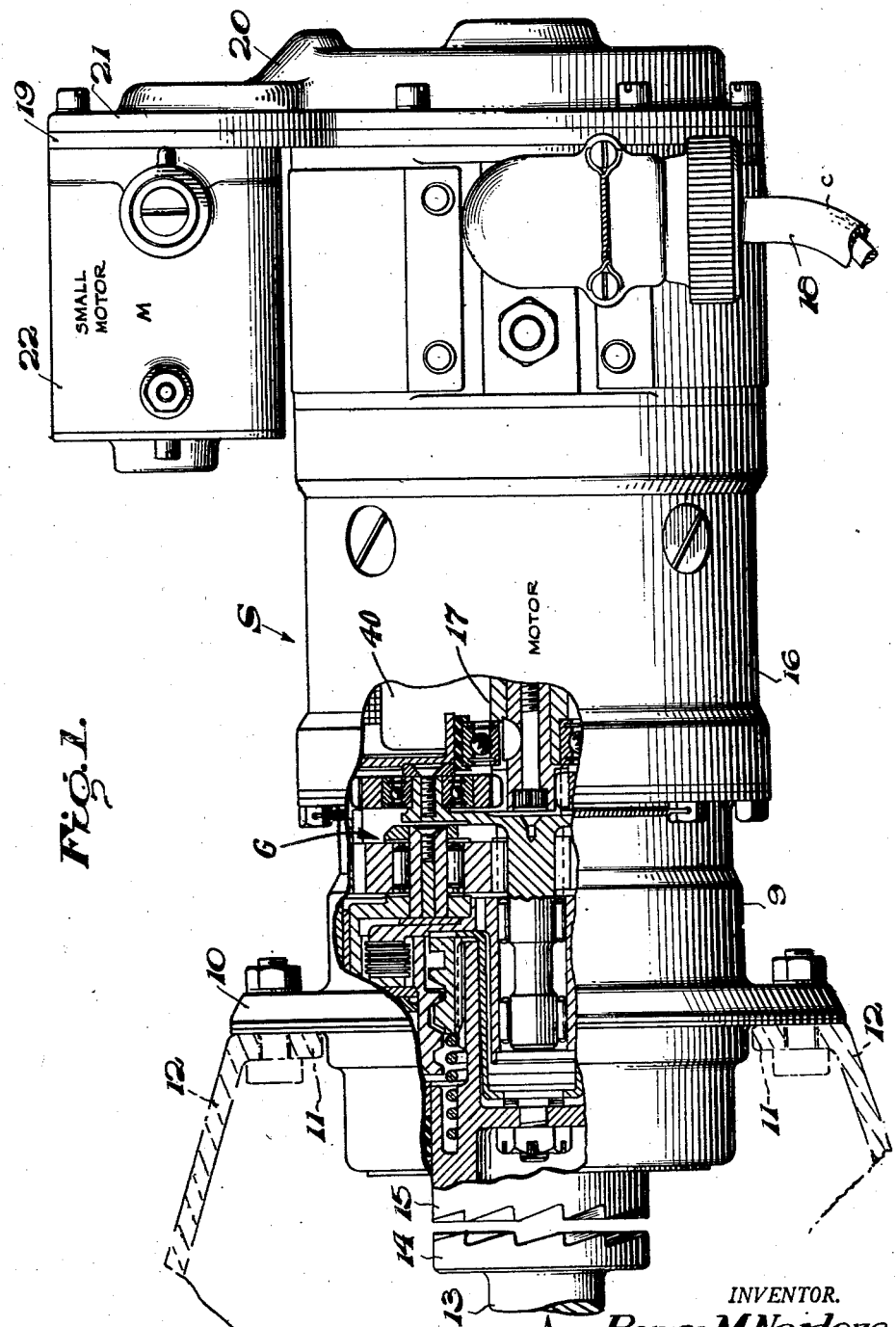
INVENTOR.
Romeo M. Nardone.
BY
John A. Robertson.
ATTORNEY Aug. 24, 1948.                R. M. NARDONE                2,447,912
                    SCAVENGING MEANS FOR AIRCRAFT ENGINES
Filed March 21, 1944                                2 Sheets-Sheet 2
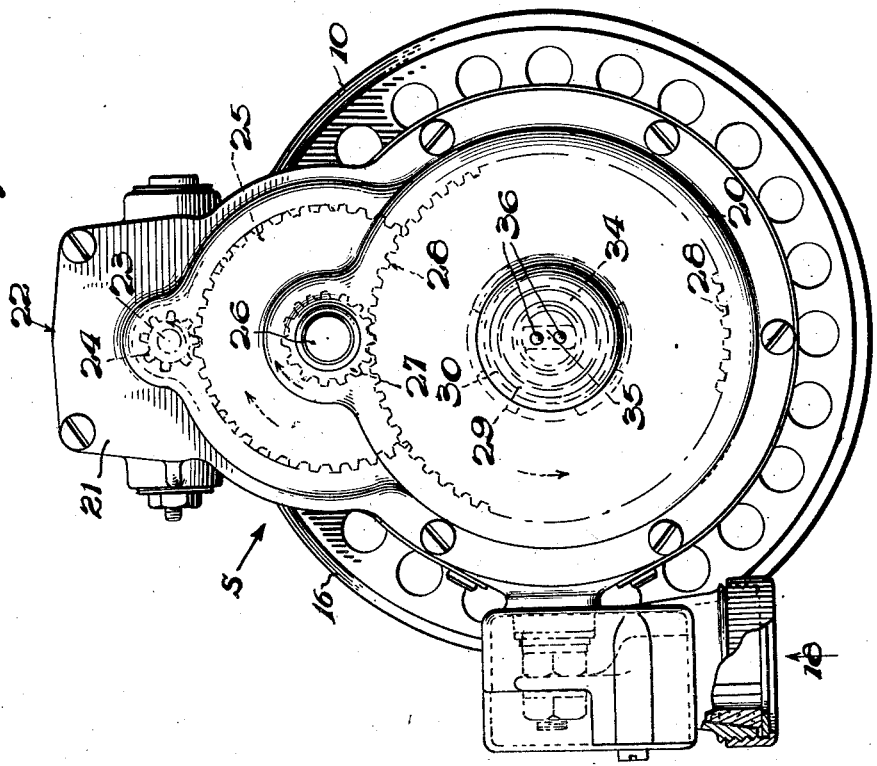
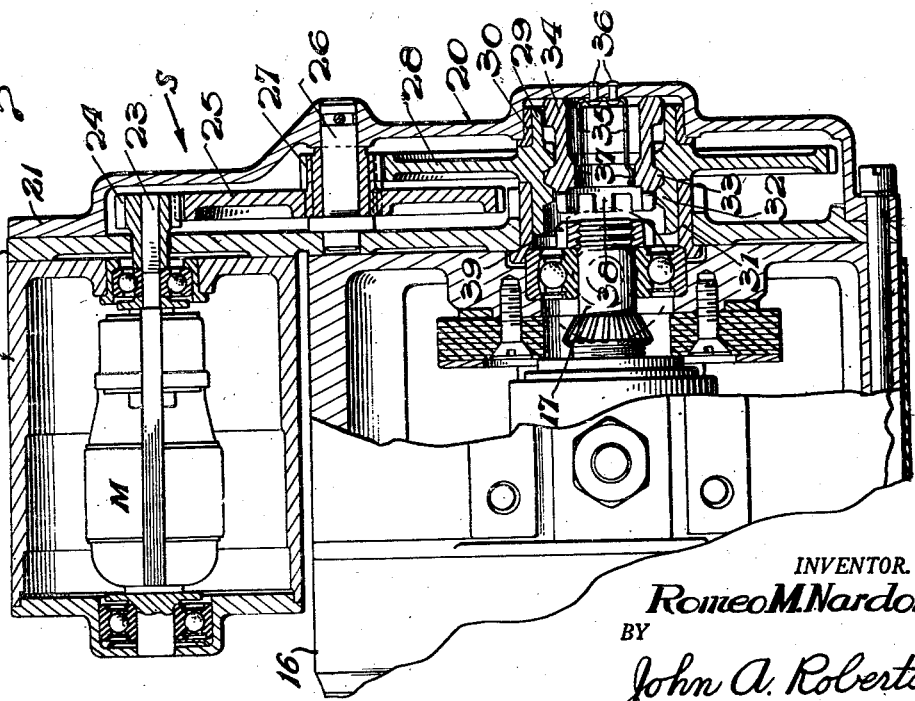
INVENTOR.
Romeo M. Nardone.
BY
John A. Robertson
ATTORNEY Patented Aug. 24, 1948

2,447,912

UNITED STATES PATENT OFFICE 2,447,912

SCAVENGING MEANS FOR AIRCRAFT ENGINES

Romeo M. Nardone, Teaneck, N. J., assignor to Bendix Aviation Corporation, Teterboro, N. J., a corporation of Delaware Application March 21, 1944, Serial No. 527,422

7 Claims. (Cl. 123—179)

The present invention deals with the starting of aircraft engines and is concerned primarily with scavenging an engine of liquid which may have collected in the bottom cylinders prior to starting.

In the Army air forces, it is mandatory to turn the crank shaft through two complete revolutions, which heretofore has been effected by manually turning the propeller.

Where the engines are installed on sea planes, this manual turning of the propeller is carried out only under great difficulty and is at best a dangerous operation. Moreover, the newer land planes are so large that it is, as a practical matter, impossible to grasp the propeller blades.

Accordingly, with these conditions in mind, this invention has in view as an important objective, the provision of means auxiliary to a usual starter for slowly rotating the crank shaft prior to starting.

More in detail, the invention has as an object, the provision of auxiliary means of the character above noted which will affect the crank-shaft to impart a slow rate of turning thereto and which rate of turning is comparable to the manual operation heretofore employed. It is important not to rotate the crank-shaft too rapidly, because there would be a grave danger of bending the connecting rods due to engagement of liquid by the pistons.

Due to the desirability of providing for the slow turning of the engine crank-shaft, the invention has as a further object the provision of an auxiliary electric motor which is associated with the starter ordinarily employed for the actual engine cranking operation and which motor is rendered effective through the gear reduction assemblies ordinarily included in such starters.

Yet a further object of the invention is the provision in combination with an aircraft engine starter, including an armature shaft, of an auxiliary electric motor which may be carried by said starter and which is operatively connected to said armature shaft through a reduction gear train.

During the ordinary use of the starter, the connection between the auxiliary motor and armature shaft will remain broken, and the invention has, as a further object, the provision of clutch means automatically establishing the operative connection to the armature shaft when the auxiliary motor is started in operation.

These and other more detailed objects and advantages of the invention will in part become apparent and in part be hereinafter stated as the description of the invention proceeds.

The invention, therefore, comprises auxiliary or electrical means for slowly turning the crank shaft of an aircraft engine prior to starting, and which means, in the example herein given, takes the form of auxiliary means associated with a usual aircraft engine starter. A reduction gear train, including a clutch device establishes the operative connection between the drive shaft of the auxiliary motor and the armature shaft of the starter.

For a full and more complete understanding of the invention, reference may be had to the following description and accompanying drawings, wherein:

Fig. 1 is a side view partially in elevation and partly in section of an aircraft engine starter carrying the auxiliary motor in accordance with the precepts of this invention;

Fig. 2 is a view somewhat similar to Fig. 1 of the end of the starter carrying the auxiliary motor, with portions of the casing broken away and shown in section to more clearly bring out the details; and Fig. 3 is an end view looking in the direction of the end of the starter carrying the auxiliary motor.

Before referring to the drawings, it will be noted that the auxiliary motor that is provided by this invention is susceptible of being combined with any of the conventional types of aircraft engine starters. In the form of the invention illustrated in the drawings, the device is shown as applied to a direct cranking starter, although this is obviously intended as no limitation on the invention.

Referring now to the drawings, wherein like reference characters denote corresponding parts, an aircraft engine starter of the direct cranking type is illustrated in Fig. 1 and referred to in its entirety by the reference character S. The starter S includes a casing formed with a flange 10 that is availed of as a means for anchoring the starter assembly to a complemental flange 11 on the engine crank-case which is represented at 12. One end of the crank-shaft of an engine is shown at 13 and carries a clutch jaw 14 of a well known type with which is adapted to cooperate a complemental jaw clutch element 15 that is driven by the starter S in a well known manner.

The starter S includes a casing section indicated at 16 which houses a usual electric motor 40 and is provided with terminal means 18 for the motor. The starter further includes a casing section shown at 9 which houses, among other instrumentalities, a planetary gear reduction train G which operatively connects the motor 40 to the clutch element 15. As shown in Figs. 1 and 2, the motor of the starter S includes an armature shaft 17.

The casing section 16 of starter S carries a flange 19 which extends upwardly above the casing proper. Anchored to this end flange is an end housing 20 having a flange 21 complemental to the flange 19. A motor casing shown at 22 is anchored to the flange 19 above the starter proper, as shown in the drawings.

The motor is shown at M in Fig. 2 and includes a drive shaft 23. Positioned within the upper portion of the end housing 20 is a pinion 24 that is carried by the drive shaft 23. The pinion 24 meshes with a large gear 25 that is mounted on a shaft 26 that is journaled in the end housing 20. Operatively connected to the gear 25, such as by being formed integral therewith, is a pinion 27 that meshes with a large gear 28 that is carried by a sleeve member 29, which in turn is journaled in bearings 30 and 31 within the end housing 20.

The inner surface of the sleeve 29 is provided with a couple of turns of a coarse thread, such as indicated at 32. Meshing with these screw threads 32 is a complemental thread 33 formed on a clutch element 34. A pair of leaf springs 35, which may be formed as a single unit, are anchored to the end housing 20, as indicated at 36 and have fingers 37 engaging the clutch member 34. These fingers 37 provide friction which normally holds the clutch member 34 in the position illustrated in Fig. 2.

The inner end of the clutch member 34 is provided with a plurality of clutch teeth 38, which are adapted to cooperate with complemental teeth 39 which are in driving relation to the armature shaft 17.

In operation when the motor M is to be operated, the motor 40 remains idle, but the armature shaft 17 is drivably connected through the gear reduction train of the starter S to the jaw clutch 15. The starter S includes usual mechanism including the gear train G for moving the jaw clutch 15 into mesh with the complemental jaw clutch 14.

The motor M is energized to drive the shaft 23 at a high rate of speed but this rate is materially decreased by the gear reduction train, including gear 25, pinion 27 and gear 28.

As the sleeve 29 is initially rotated, the clutch member 34 is moved due to the cooperation of threads 32 and 33 so that the teeth 38 mesh with the complemental teeth 39 on the armature shaft 17. The latter will be driven, and through the usual gear reduction train the engine crankshaft is driven.

The engine crank-shaft 13 will rotate at a rate of about two revolutions per minute. This is about what is required to scavenge a certain quantity of liquid from the bottom cylinders of the engine, or to indicate a hydraulic lock by a greater amount of the liquid at the bottom cylinders, without likelihood of causing damage to the structural parts of the engine, such as the connecting rods.

Where scavenging occurs, which will be indicated by continued turning of the propeller, the engine is in condition for starting, but a hydraulic lock too heavy for scavenging will be indicated by stopping of rotation of the propeller.

By a "light" or "heavy" hydraulic lock, or a lock between light and heavy, is meant not merely quantity of liquid, but the ability, or lack of ability, of the liquid to pass a piston under pressure by the motor M, under certain temperature or other conditions of the liquid or the engine, as where engine parts are loose or tight.

While only one embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. In combination, an aircraft engine starter including a jaw clutch member, a motor having an armature shaft, and a gear reduction train between the said shaft and said clutch member, an auxiliary motor carried by said starter, and including a drive shaft having a pinion at one end, a reduction gear train in driving relation to said pinion, an internally threaded sleeve included as the last element of said gear train, a clutch member having a thread in operative engagement with the threads of said sleeve, jaw teeth on said clutch member, and complemental teeth on said armature shaft.

2. In combination, an aircraft engine starter including an engine starting jaw, a motor having an armature shaft, a gear train between said shaft and said jaw, an auxiliary motor, a gear train operatively connecting said auxiliary motor to said armature shaft, said gear train comprising means including a movable clutch member operative upon energization of said auxiliary motor to effect driving relation between said auxiliary motor and said armature shaft.

3. In combination, an aircraft engine starter including a motor having an armature shaft, a second motor, a gear train operatively connecting said second motor to said armature shaft, said gear train including a movable clutch member responsive to operation of said second motor for effecting driving relation between said second motor and said armature shaft, and means for yieldably holding said clutch member in position breaking said driving connection.

4. In combination, an aircraft engine starter including a motor having an armature shaft, a second motor, and a gear train operatively connecting said second motor to said armature shaft, said gear train including a sleeve, a movable clutch together with complemental elements on said sleeve and clutch for causing axial movement of said clutch relative to said sleeve upon initial rotation of said sleeve, jaw teeth on said clutch member, and complemental jaw teeth on said shaft.

5. In an engine starter comprising a rotatable driving shaft, a member adapted to be driven by said shaft to rotate an engine element to start the engine, and speed-reducing means, said shaft and said member being adapted for cooperation with said speed-reducing means for translating the speed of said shaft into engine starting speed of said member, the combination of means providing for driving said member at a speed reduced from said starting speed and including second speed-reducing means adapted to operate through the intermediary of said first speed reducing means, and means adapted to operatively connect said second speed-reducing means to, and to disconnect the same from, said first speed-reducing means.

6. In an engine starter comprising a rotatable driving shaft, a member adapted to be driven by said shaft to rotate an engine element to start the engine, and speed-reducing means, said shaft and said member being adapted for cooperation with said speed-reducing means for translating the speed of said shaft into engine starting speed of said member, the combination of means providing for driving said member at a speed reduced from said starting speed and including second speed-reducing means adapted to operate through the intermediary of said first speed reducing means, and means adapted to render said second speed-reducing means effective and ineffective, respectively, relative to said first speed-reducing means.

7. The combination with an engine starter having a rotatable driving shaft, a member adapted to be driven by said shaft to rotate an engine element to start the engine, and speed-reducing means, said shaft and said member being adapted for cooperation with said speed-reducing means for translating the speed of the shaft into engine starting speed of said member, of means providing for driving said member at a speed sufficiently reduced from said starting speed to turn the engine over at a rate to prevent damage from, and/or to clear, a hydraulic lock in an inverted cylinder of the engine and including second speed-reducing means adapted to operate through the intermediary of said first speed-reducing means, and means adapted to render said second speed-reducing means effective and ineffective, respectively, relative to said first speed-reducing means.

ROMEO M. NARDONE.

REFERENCES CITED

The following references are of record in the file of this patent:

UNITED STATES PATENTS

| Number | Name | Date |
|---|---|---|
| 1,891,868 | Ceabloom | Dec. 20, 1932 |
| 2,331,077 | Nardone | Oct. 5, 1943 |